United States Patent [19]

Courvoisier et al.

[11] 4,450,347
[45] May 22, 1984

[54] HEATING BODY

[75] Inventors: Guy Courvoisier; Simon Arieh, both of Geneva, Switzerland

[73] Assignee: Battelle Memorial Institute, Carouge, Switzerland

[21] Appl. No.: 395,018

[22] PCT Filed: Nov. 10, 1981

[86] PCT No.: PCT/CH81/00125
§ 371 Date: Jun. 24, 1982
§ 102(e) Date: Jun. 24, 1982

[87] PCT Pub. No.: WO82/01799
PCT Pub. Date: May 27, 1982

[30] Foreign Application Priority Data

Nov. 12, 1980 [CH] Switzerland .................. 8385/80

[51] Int. Cl.³ .............................. H05B 3/34
[52] U.S. Cl. ................... 219/549; 219/345; 219/527; 338/280; 338/293; 338/285
[58] Field of Search ............. 219/211, 213, 345, 464, 219/522, 527, 543, 548, 549, 552; 338/280, 281, 292, 285, 290, 293, 308, 309; 29/610 R, 611, 620

[56] References Cited

U.S. PATENT DOCUMENTS

| 600,057 | 3/1898 | Ball ....................................... 338/280 |
| 2,680,184 | 6/1954 | Cox .................................. 338/292 X |
| 3,214,565 | 10/1965 | Hager et al. ......................... 219/345 |
| 3,366,777 | 1/1968 | Brittan et al. ...................... 219/522 |
| 3,408,735 | 11/1968 | Eisler .................................... 29/610 |
| 3,427,712 | 2/1969 | Witdoeckt ...................... 338/280 X |
| 3,539,767 | 11/1970 | Eisler .............................. 219/345 X |

FOREIGN PATENT DOCUMENTS

| 354579 | 1/1980 | Austria . |
| 4829 | 10/1979 | European Pat. Off. . |
| 421330 | 3/1967 | Switzerland . |
| 1192927 | 5/1970 | United Kingdom . |

*Primary Examiner*—Volodymyr Y. Mayewsky
*Attorney, Agent, or Firm*—Karl F. Ross; Herbert Dubno

[57] ABSTRACT

This heating body is cut from a metal sheet (1) and defined by slots (2) obtained by punch stamping on a support (4) of plastics foam. The opposite edges of these slots (2) are spaced from one another by deformation of the portion of the conductor (7) adjacent to these slots, obtained by the bevelled shape of the portion of the cutter (3) defining the cutting edge and by the compressibility of the material forming the support (4). According to the method of manufacturing this heating body, its external profile and the slots (2) are obtained by a same single punching operation.

4 Claims, 9 Drawing Figures

HEATING BODY

CROSS REFERENCE TO RELATED APPLICATION

This application is a national phase of PCT/CH81/00125 filed Nov. 10, 1981 and based upon the European international application 81 81,064.4 of Apr. 30, 1981 and Swiss application 8385/80.3 of Nov. 12, 1980.

The present invention relates to a heating body comprising a metal sheet associated at least at one of its faces with an insulating support and having parallel slots extending alternately from two opposite edges of this sheet and terminating at a distance from the edge opposite to that from which they extend in order to form a continuous resistive conductor over the entire surface of this sheet.

BACKGROUND OF THE INVENTION

It has already been proposed in Austrian Pat. No. 345 579, the British Pat. No. 1,192,927 and U.S. Pat. No. 3,214,565 in particular, to form a heating body from a metal sheet by providing a conductor having a substantially constant section as a result of parallel slots extending alternately from two opposite edges of this sheet and terminating at a certain distance from the edge opposite to that from which they extend in order to distribute the heating current over the entire surface of the metal sheet in a substantially uniform manner. These slots are obtained in a machining operation during which material from the metal sheet is removed over a certain width in particular by milling or sawing, in order to ensure the desired current distribution.

The manufacture of a heating body of this type requires, in particular if the metal sheet is thin, the initial fastening of this sheet to a support before the slots are cut by milling or sawing. The main drawback of the solutions proposed up to now is that the cutting of the slots requires a removal of material in order to provide a spacing between the edges of these slots thus involving a machining operation which is relatively slow and therefore badly adapted to the low cost production of a mass produced article.

It has also been proposed in the European Patent EP 0 004 829 to associate a heating body with a foam of a thermo-formable material so as to be able to mold this foam, from which a blank designed to provide an accurate fit between a piece of clothing or an accessory and a part of the human body has in the first instance been produced. This fit is obtained by moulding this blank, heated by the heating body which is incorporated therein, to the exact dimensions of this part of the human body.

This heating body is constructed using printed circuit techniques. Although this technique is completely suited to the nature of the plastic foam support, to the extent in which it enables the separate production of the heating body and its combination with the foam support, this involves a technology reserved for the manufacture of electrical circuits. The cost of manufacture of these circuits is disproportionate when this technology is only used to provide simple heating bodies designed for mass produced articles since a heating body of this type does not require the accuracy of printed circuits.

In addition it has already been proposed in the Swiss Pat. No. 421 330 to provide a heating body of the type mentioned above by stamping of a thin metal sheet glued to an insulating support. It should however be noted that a method of manufacture of this type gives rise to considerable practical difficulties, given that when the metal sheet and the insulating coating are cut, the sheet and the coating are transformed into a thin zigzag shaped strip such that the geometry of the sheet no longer exists in the absence of a support, which leads to problems in the manufacture, handling and use of the heating body.

OBJECT OF THE INVENTION

The object of the invention is to remedy, at least partially, the drawbacks of the above-mentioned solutions.

SUMMARY OF THE INVENTION

For this purpose, the invention firstly relates to a heating body comprising a metal sheet associated by at least one of its faces with an insulating support and having parallel slots extending alternately from two opposite edges of this sheet and terminating at a distance from the edge opposite to that from which they extend in order to form a continuous resistive conductor over the entire surface of this sheet, this conductor being designed to be connected to a current source at both its ends, the slots being provided by punch cutting and their opposite edges being spaced from one another by deformation of the conductor portion adjacent to at least one of the edges of these slots. This heating body is characterised in that the said slots only at most traverse the said support over a portion of their length in order to connect together in a lateral manner the parallel portions of the said conductor.

The invention also relates to a method of manufacturing this heating body characterised in that both the cutting of the peripheral edge of this heating body and its support and the cutting of the slots designed to define the said conductor are obtained by means of a single stamping operation.

The invention lastly relates to a use of this heating body associated with at least one layer of thermo-formable foam in order to match two non-complementary surfaces to one another by compression and then heating of the said foam to the thermo-forming temperature between the said non-complementary surfaces.

The main advantage of the invention lies in the fact that, once cut, the parallel edges of the resistive conductor remain laterally connected to each other by virtue of the fact that the support on which the metal sheet is cut, after having been glued, is not completely cut or at least not cut over the entire length of the slot. The heating body obtained therefore retains, after cutting, its geometrical cohesion and may therefore be obtained from a single cutting operation of a sheet material formed by the metal sheet and its support which are fixed together.

BRIEF DESCRIPTION OF THE DRAWING

The attached drawing shows in diagram form and by way of example, an embodiment and variants of the heating body of the present invention.

SPECIFIC DESCRIPTION

Figure 1:
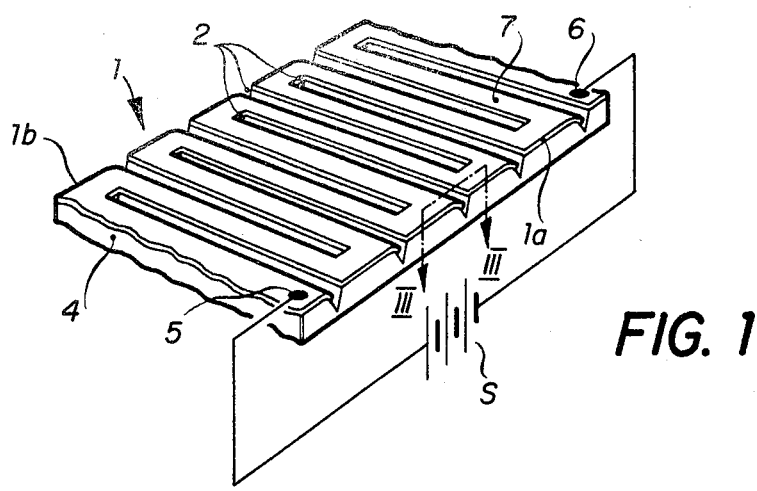
FIG. 1 is a perspective view of this embodiment.
Figure 3:
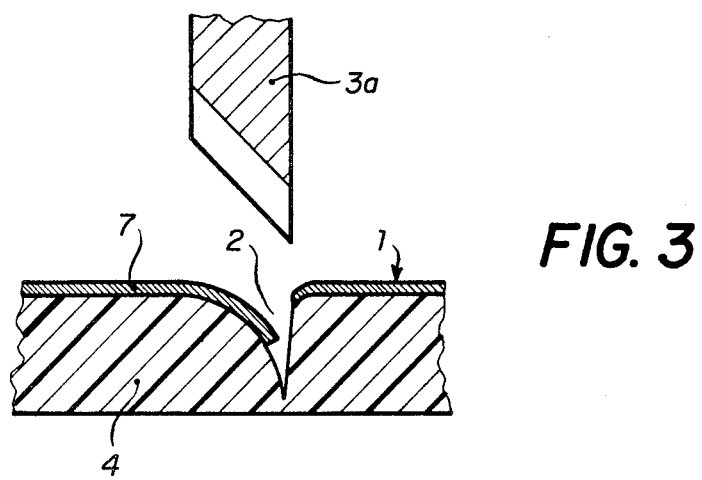
FIG. 3 is a view in section along the line II—II of FIG. 1.

The heating body shown in FIGS. 1 and 3 is constituted by a metal sheet 1, for example an aluminum sheet having a thickness of approximately 0.05 mm, in which the slots 2 are punched out by means of a cutter 3 provided with blades 3a.

For this purpose, the metal sheet 1 is disposed on a cutting support 4 made of an elastically compressible material such as a sheet of plastic foam designed to enable the blades 3a of the cutter 3 to pass through the metal sheet 1. This support 4 is itself located on the block of a stamping press (not shown). The metal sheet 1 is preferably fixed to the support 4 by adhesive. Consequently this solution is particularly suitable when the heating body constructed in this way is designed to heat foam of a thermo-formable type such as a polyethylene foam, as described for example in the European Patent Application No. 0 004 829.

In the embodiment shown in FIG. 1, the slots 2 are parallel and extend alternately from two opposite edges 1a, 1b of the metal sheet 1 but terminate at a certain distance from the other edge, thus forming a continuous electrical conductor 7 constituting a heating body of substantially constant section between two terminals 5 and 6 connected to an electrical current source S.

As can be seen in particular from FIG. 3, the opposite edges of the slots 2 are spaced from one another, this spacing being obtained by deformation of the portion of the resistive conductor adjacent to the edges of this slot 2 such that these edges project from the plane of the metal sheet on the side of the sheet adjacent to the support 4. This deformation is obtained during the cutting operation and is a function of the pressure required to cause the tool to penetrate into the metal sheet 1 and the compression resistance of the cutting support 4. The pressure of penetration of the cutter 3 is a function of the thickness and the nature of the material used for the metal sheet 1 and the shape of the cutting edge of the cutter, as will be explained in more detail below. The deformation of the edges of the slot may therefore be of a sufficient size to separate and isolate in an electrical manner from one another the adjacent portions of the resistive conductor 7 without requiring any removal of material. With the two edges of the slot 2 spaced in this way, the portions of the resistive electrical conductor adjacent to this slot are therefore insulated from one another thus forcing the current to pass through the resistive conductor 7 over its entire length and thus to heat, by Joule effect, the entire surface of the metal sheet.

In order to facilitate the cutting of the metal sheet 1 and concentrate the initial pressure of the blades 3a of the cutter 3 on very small surfaces thus increasing the penetration capacity of these blades 3a, the cutting edge of these blades may be scalloped. In addition, in particular when the support 4 is designed to remain fixed to the metal sheet 1 once the latter has been cut, the formation of scallops along the cutting edge of the blade 3a enables material bridges to be left in the support 4 between the points of the scallops such that the edges of the slots cut in this support 4 are not separated. The support therefore retains its geometry and consequently that of the conductor cut from the metal sheet 1. This enables the subsequent handling and use of the heating body whose parallel edges remain connected laterally to one another by means of the support, as shown in FIG. 3, as the rear face of the support 4 does not have a cut section or possibly only has a cut section at the location of the points of the blade 3a. Tests carried out with straight blades which only passed through approximately half the thickness of the support over the entire length of the slot, also enabled good results to be obtained.

Figure 2:
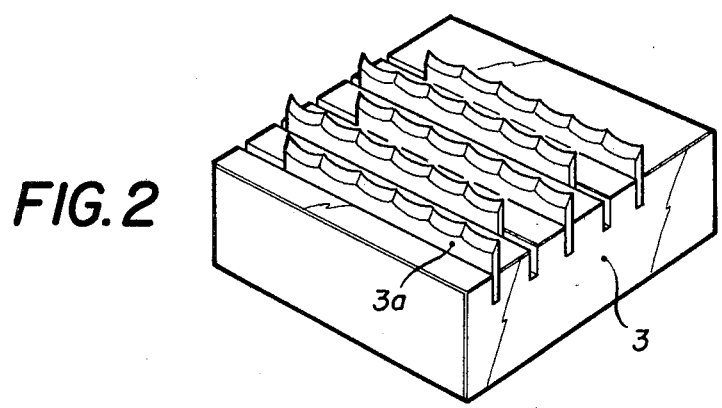
FIG. 2 is a perspective view of a cutting tool for this heating body.

The spacing provided between the edges of the slots 2 may be increased by using a blade 3a of a cutter 3 having one face, adjacent to the cutting edge, forming a bevel with the plane of the blade, as shown in FIG. 2, in order to enable further deformation of the edge of the slot on the side of the bevel of this blade.

Figure 4:
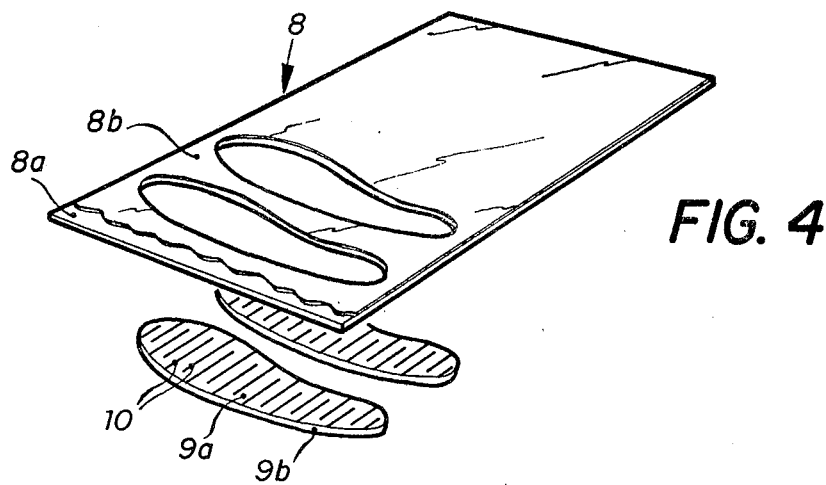
FIG. 4 is a perspective view illustrating the manufacture of a heating body associated with a sole of thermoformable material.

Amongst the advantages of this heating body and its method of manufacture, it should be noted that the periphery of the body may be cut, during the same cutting operation as for the slots, from a composite sheet material 8 (FIG. 4) formed from a sheet 8a of elastically compressible plastic foam on which a sheet of aluminium 8b is attached by adhesive. In this example, the heating bodies are cut into the shape of soles in order to dispose each body 9a with its underlying foam layer 9b on a sole blank of thermo-formable plastic foam (not shown), such as a low density, nitrogen blown polyethylene foam, in order to obtain a thermo-formable sole with incorporated heating designed to be located within a shoe in order to match this shoe very accurately to the foot of the wearer by molding of the sole. Tests carried out showed that the thermo-forming temperature of "low density" polyethylene foams, i.e. approximately 140° C., was well tolerated and did not cause any burning of the skin.

Figure 5:
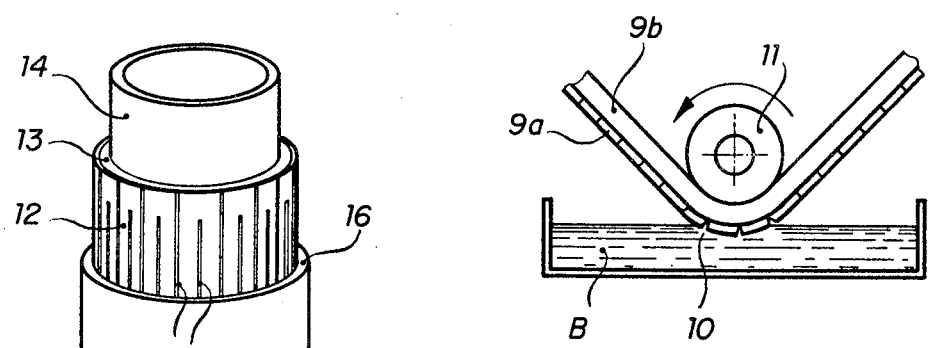
FIG. 5 is a perspective view of a further manufacturing stage of this sole.

FIG. 4 again shows the distribution of the slots 10 which may be used in the case of a heating body of this type. In the application in question, it may be that the spacing between the edges of the slots 10 is still insufficient, in particular when the heating body is subject to strong compression during use, as may be the case with a heated sole. It is then envisaged to space the slots 10 after they have been cut for example by bending the cut foam sheet 9b and the heating body 9a present on the convex face of this foam sheet 9b by passing it about a cylinder 11 (FIG. 5) and by introducing into these spaced slots an insulating substance which may, for example, be in a liquid, solid or gaseous form. In this way it is possible, for example, to coat the edges of the slot 10 with an insulating lacquer or a like product, preventing the edges of the slot 10 from coming into contact, by passing the heating body 9a through a bath B containing the liquid insulating substance. As a variant it is also possible to introduce a solid insulating gasket into this slot.

As mentioned above, the heating body is preferably glued to a support of electrical insulating material such that, when cut, the adjacent portions of the resistive conductor formed in this way remain connected by means of the support material so that the heating body may be readily handled.

For this purpose, the metal sheet may be glued to a layer of plastic foam by a rubber-based adhesive which decomposes at a temperature of approximately 90° C. When the heating body has been cut, it then has its free face glued to a further receiver surface on which it is designed to be permanently fixed by means of a thermosetting resin, for example an epoxy resin. When the free face of the heating body has been applied to this adhesive-bearing receiver surface, the heating body is connected to a current source in order to raise its temperature to approximately 100° C. such that the rubber-based adhesive decomposes. It is then possible to remove the foam which has acted as a support during cutting, the heating body remaining fixed to this surface by the hardened epoxy resin.

Figure 6:
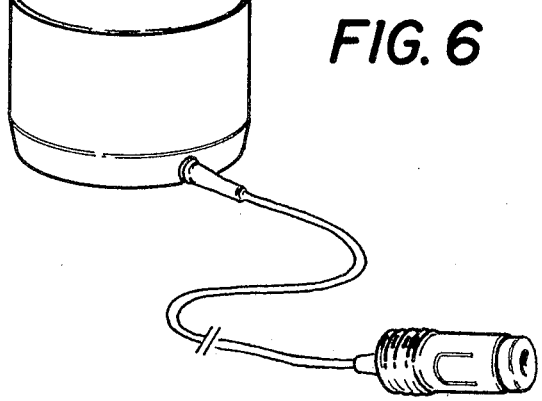
FIG. 6 is a view of a heated vacuum flask with some components removed.

FIG. 6 illustrates the application of the invention to the manufacture of a vacuum flask in which the heating body 12 is cut on a layer of foam 13 which is relatively thin and dense and is a good conductor of heat such as a neoprene foam on which it is glued. When the heating body has been cut, the free face of the foam layer 13 is then glued around a flask 14. As the slots 15 of the heating body are orientated along the generatrices of the flask, the edges of these slots are spaced. The heating body 12 is then covered with a layer of a covering insulating foam 16.

It is also possible to envisage cutting the slots by means of a cutter having two symmetrical bevels on either side of the cutting edge thus producing an identical deformation of the portions of the resistive conductor adjacent to the opposite edges of this slot.

Figure 7:
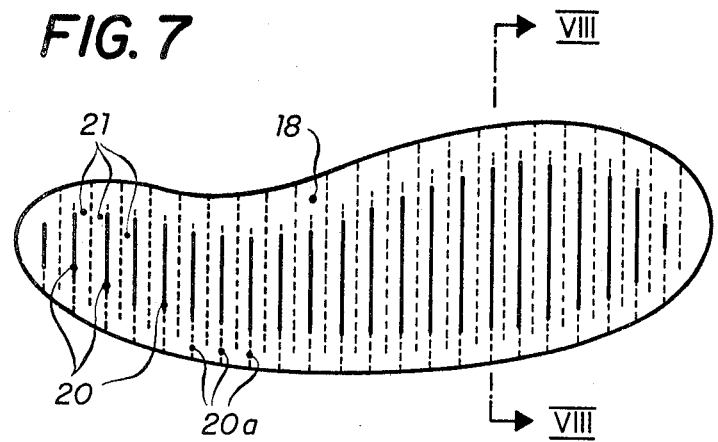
FIG. 7 is a plan view from the side of the support of a further variant of the invention.
Figure 8:
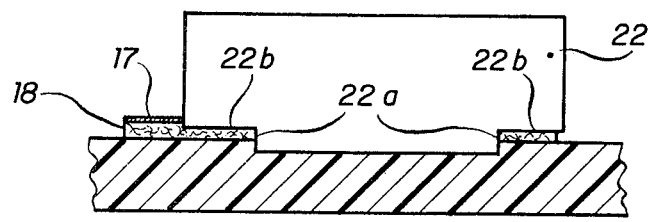
FIG. 8 is an enlarged view in cross-section along the line VIII—VIII of FIG. 7 during the cutting operation.
Figure 9:
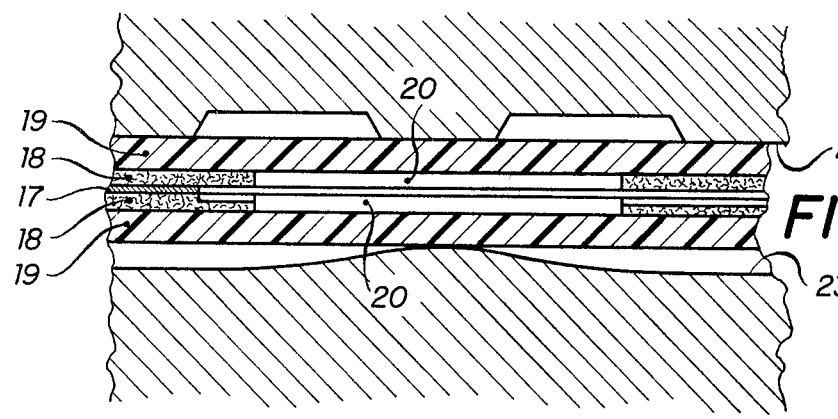
FIG. 9 is a cross-section showing a use of the heating body for matching two non-complementary surfaces to one another.

In the case of use of the heating body of the invention to obtain the thermo-forming of a foam layer in order to match two non-complementary surfaces to one another as shown in FIG. 9, when the support of the heating body is constituted by the thermoplastic foam itself, at the moment of thermo-forming, when the foam is at its flow temperature, the heating body is no longer mechanically reinforced and is then required to support all the stresses. As this heating body is generally made of a sheet of aluminium having a thickness of approximately 0.05 mm, it is not unusual for these stresses to exceed the tensile strength limits such that the heating body is no longer usable. It is for this reason that, in accordance with a variant of the present invention (FIGS. 7, 8 and 9) a metal sheet 17 is fixed to a support 18 of a non thermo-formable material, such as paper, cardboard or synthetic felt. In order that the support has a suitable mechanical strength during the thermo-forming operation of the layer(s) of foam 19 provided on one or both sides of the metal sheet 17 and its support 18, the material of the support, in particular of cardboard or felt, should advantageously be of a stiffness such that, in certain cases, it opposes the local crushing of the foam between the two non-complementary surfaces and tends to distribute the pressure over a larger surface area than that of the surface irregularity causing the local crushing of the foam. This takes place when one of the surfaces to be adapted has, for example, a close-set sequence of convex and concave portions which the support is unable to fit as a result of its stiffness.

In order to remedy this drawback, the material of the support 18 may have passing through it slots 20 provided along slots 20a of the metal sheet 17 but terminating at a certain distance from the two opposite edges of the support. The parallel slots passing through this support form tongues 21 attached at their two ends to the opposite edges of this support. While retaining the geometry of the support, these tongues 21 enable a large degree of flexibility of adaptation as a result of the fact that two adjacent tongues may be displaced in two opposite directions and may even be slightly spaced from one another in their median portion. In addition these slots considerably increase the flexibility of the support 18. In the case of a thermo-formable sole for example, the tongues 21 which are provided transversely increase the flexibility of the sole in the longitudinal direction thereby increasing comfort. By means of these tongues, it is therefore possible to reconcile the mechanical strengthening of the conductor portions resulting from the cutting of the metal sheet 17 with the flexibility of the support, which is of great importance when it is required to match two non-complementary surfaces by the thermo-forming of a foam layer which has previously been compressed in order to enable a local crushing of this layer as a function of the irregularities between the two surfaces to be matched.

It should be noted that the width of the tongues 21 is not necessarily identical to that of the parallel portions of the resistive conductor cut from the metal sheet 17, but may correspond to any multiple of this width. In the case of a metal sheet 17 having one face only associated with a support 18, the cutting of the resistive conductor and the slots 20 passing through the support may be carried out in a single operation using a cutter 22 having a non-scalloped blade which has two projecting edges 22a and by controlling its penetration such that the portion of the blade 22b following this projecting edge only partially passes through the thickness of the support 18 such that only the metal sheet 17 is cut facing this portion 22b of the cutter.

If, however, a support 18 extends along both sides of the metal sheet, as shown in FIG. 9, one of these two supports must be cut separately and then added to the free side of the metal sheet 17 associated with the other support. As the external contour of the heating body and the parallel slots forming the conductor are preferably simultaneously punched out, in accordance with the method of production illustrated and described with respect to FIG. 4, and in that both the support 18 associated with the metal sheet 17 and the other single support are cut with the same tool, it is sufficient to line up the respective edges of the two supports for their slots to coincide as well. FIG. 9 also shows the case in which the heating body formed from the metal sheet 17, held between two support layers 18, receives two thicknesses 19 of foam of a thermo-formable material designed to match the two surfaces 23, 24 which are non-complementary, by compression of these surfaces and thermo-forming of the foam thicknesses 23 by means of the heating body 17.

We claim:

1. A heating body comprising a metal sheet attached by at least one of its faces to a surface of an insulating support and having parallel slots extending alternately from two opposite edges of this sheet and terminating at a distance from the edge opposite to that from which they start in order to form a resistive conductor over the entire surface of the sheet, designed to be connected to a current source at opposite ends, these slots being provided by punching and being spaced from one another by deformation of the portion of the conductor adjacent to at least one of the said edges of these slots into the surface of the support, said slots passing through the said support only, at the most, over a portion of their length in order to laterally connect the parallel portions of the said conductor mechanically to one another at both ends of each slot while providing electrical interconnection of adjacent parallel portions only at one end of each slot.

2. The heating body defined in claim 1 wherein said slots pass through the said support perpendicular to at least one portion of the slots passing through the said sheet, while terminating at a distance from the opposite edges of this support, in order to form adjacent laminations attached by their two ends to the marginal portions of this support.

3. The heating body defined in claim 1 or 2 wherein said support is of a non-thermo-formable flexible material.

4. The heating body defined in claim 1 wherein the said slots do not pass through the said support at least over the major portion of their length.

* * * * *